United States Patent
Izyk

(10) Patent No.: US 8,074,870 B2
(45) Date of Patent: Dec. 13, 2011

(54) ANIMAL HERDING DEVICE

(76) Inventor: Robert A. Izyk, Blackie (CA)

( * ) Notice: Subject to any disclaimer, the term of this patent is extended or adjusted under 35 U.S.C. 154(b) by 29 days.

(21) Appl. No.: 11/673,239

(22) Filed: Feb. 9, 2007

(65) Prior Publication Data

US 2007/0181660 A1 Aug. 9, 2007

(30) Foreign Application Priority Data

Feb. 9, 2006 (CA) ..................................... 2535752

(51) Int. Cl.
*B68B 11/00* (2006.01)
(52) U.S. Cl. ........................... 231/2.1; 463/47.2; 446/419
(58) Field of Classification Search .................... 231/2.1; 446/421, 418, 419, 422; 463/47.2; 119/707; 84/402, 406; 206/540
See application file for complete search history.

(56) References Cited

U.S. PATENT DOCUMENTS

| | | | |
|---|---|---|---|
| 378,752 A * | 2/1888 | Ader | 215/6 |
| 1,753,493 A * | 4/1930 | Zadek | 446/419 |
| 3,136,480 A * | 6/1964 | O'Neill | 231/2.1 |
| 4,588,387 A * | 5/1986 | Swenson | 446/130 |
| 5,138,535 A * | 8/1992 | Aragon, Jr. | 362/102 |
| 5,451,047 A * | 9/1995 | Liu | 473/564 |
| 5,483,859 A * | 1/1996 | Singer | 84/322 |
| 5,605,244 A * | 2/1997 | Bradshaw | 220/320 |
| 5,839,967 A * | 11/1998 | Moe | 463/47.2 |
| 6,146,236 A * | 11/2000 | Kay | 446/419 |
| 6,302,813 B1 * | 10/2001 | Sturgeon et al. | 473/564 |
| 6,350,200 B2 * | 2/2002 | Starrett et al. | 463/47.2 |
| 6,365,810 B1 * | 4/2002 | Enhoffer et al. | 84/402 |
| 6,419,081 B1 * | 7/2002 | Ross | 206/217 |
| 6,512,169 B1 * | 1/2003 | Santini | 84/402 |
| 2003/0224689 A1 * | 12/2003 | Jenkins | 446/74 |

FOREIGN PATENT DOCUMENTS

DE 38 44 186 A1 * 7/1990
* cited by examiner

*Primary Examiner* — Rob Swiatek
(74) *Attorney, Agent, or Firm* — Thomas E. Malyszko

(57) ABSTRACT

An animal herding device has an elongate tubular body portion adapted to avoid kinking thereof, a hand gripping member at one end and a noise making member at the other end. The body portion may be internally reinforced with a rope or like means. The body portion may also be optionally fitted with padding for specified uses.

17 Claims, 2 Drawing Sheets

ANIMAL HERDING DEVICE

FIELD OF THE INVENTION

Figure 1:
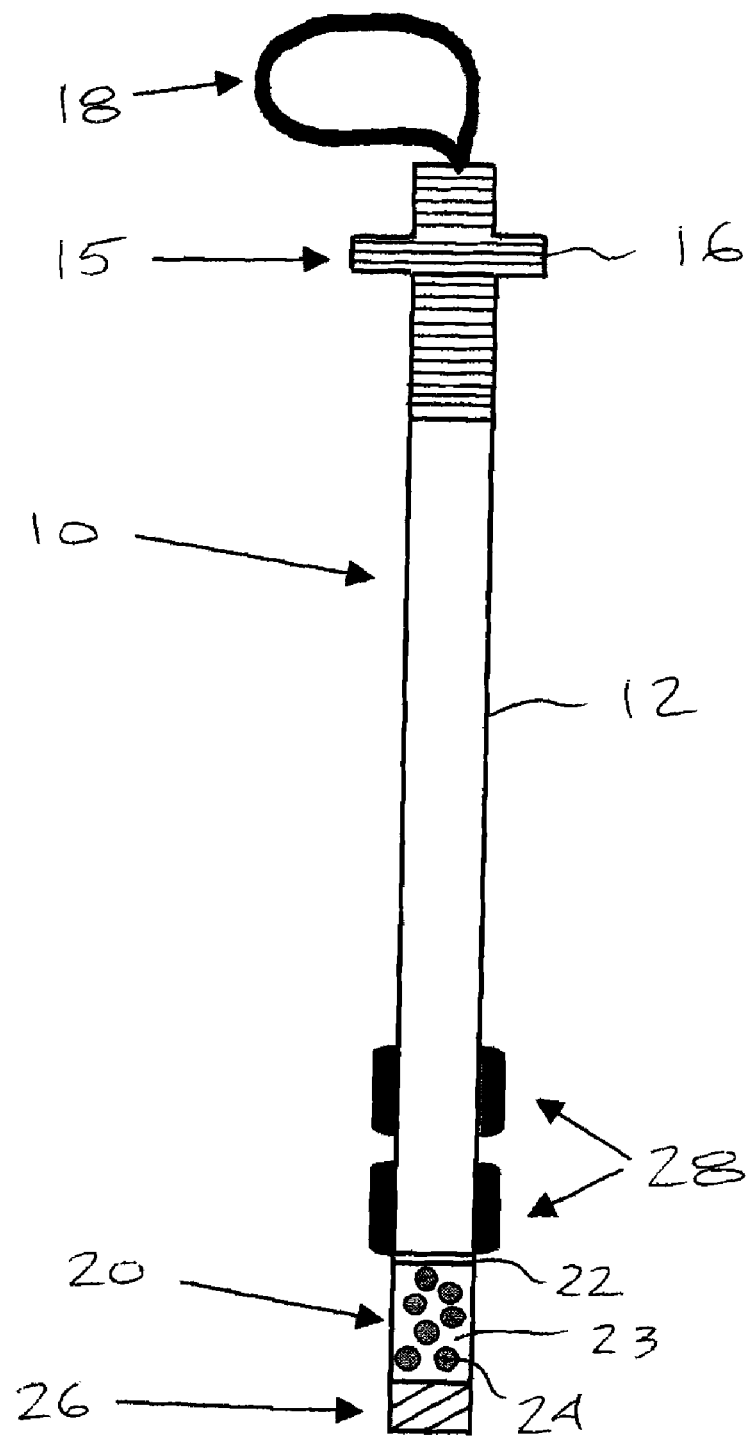

The present invention relates to devices for herding animals, and in particular for herding livestock, such as cattle and pigs.

BACKGROUND OF THE INVENTION

There are several commercially available products currently used as aids to herd animals, particularly livestock such as cattle, at feedlots, stock yards and the like. One such product is a flexible fiberglass cane capable of bending when giving a cow a nudge or a light wack on its backside, so as to avoid breakage. However, in cold temperatures, the cane becomes stiffer and brittle, and tends to break off sequentially in short (e.g. 1 inch; 2.5 cm) pieces. Further, when a cap dislodges from the cane's end, the cane begins to frey and the resulting fibreglass slivers tend to lodge in the user. The cane also lacks a good handle grip, and its short length requires the herder to get too close to the animals being herded.

Electric prods have also been used, and are very effective in making cattle move. However, they are increasingly viewed as being inhumane. The prods tend to get the animals upset and stressed, and can cause the animals to suddenly bolt, which results in unwanted animal handling difficulties. Consequently, such prods are now often prohibited from use on feedlots and on cattle transport trucks ("cattle liners").

Yet another product is a type of "paddle". It is visually similar to a canoe paddle, but the hand gripping portion is more typical of a golf club. The large paddle portion makes a rattling noise, but it is so heavy that it makes the product tedious to hold and maneuver, particularly for extended use. Just as with the cane, it is also too short.

What is therefore desired is a novel animal herding device which overcomes the limitations and disadvantages of the existing products.

SUMMARY OF THE PRESENT INVENTION

According to the present invention, there is provided in one aspect an animal herding device comprising:
an elongate tubular body portion having opposed first and second ends, and adapted to avoid kinking thereof;
a hand gripping member at said first end of said body portion; and,
a noise making member at said second end of said body portion.

A rope defining means of reinforcing said tubular body portion may be optionally located therewithin.

The body portion may also be optionally fitted with padding for specified uses.

BRIEF DESCRIPTION OF THE DRAWING FIGURES

Figure 2:
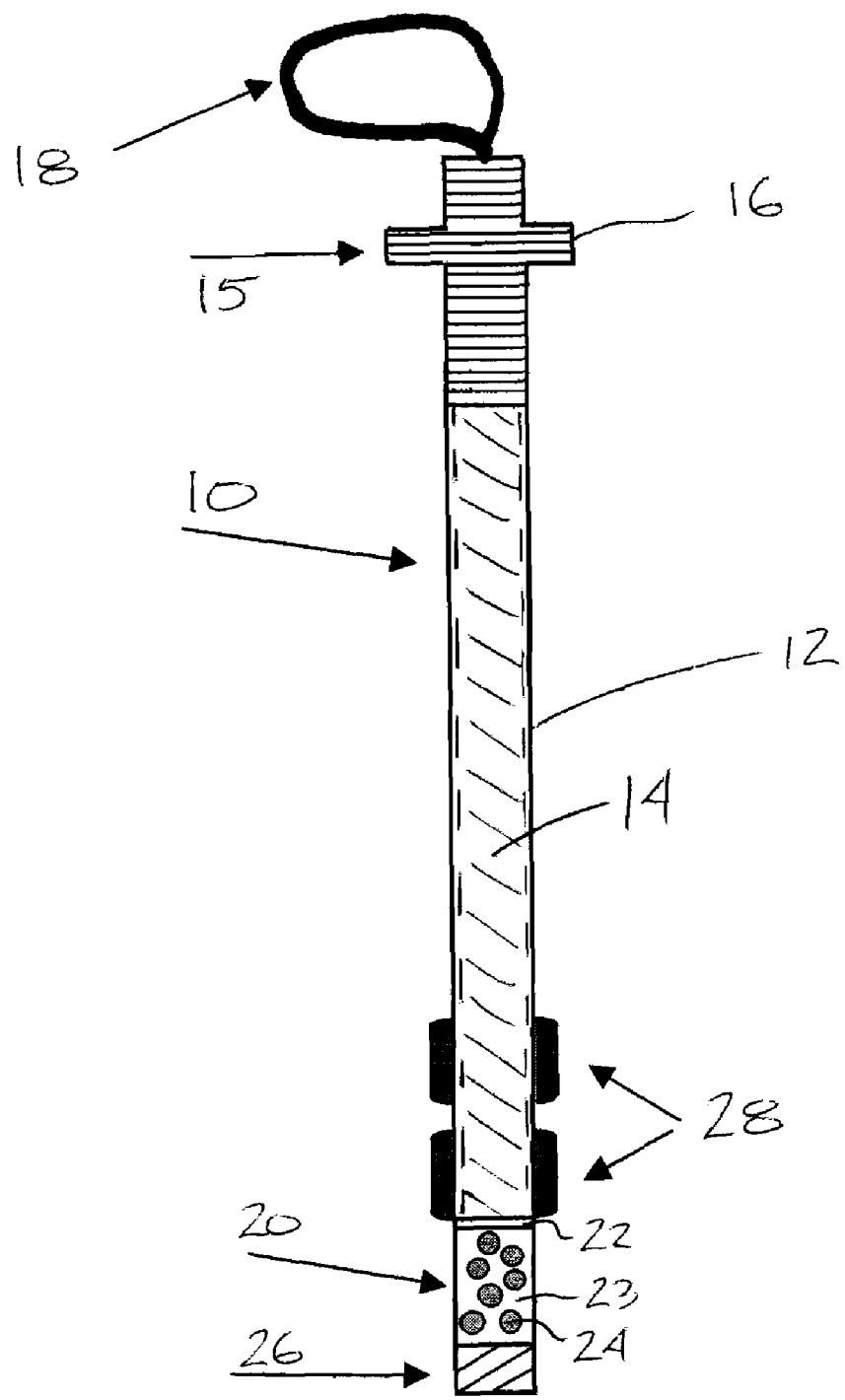

Embodiments of the invention will now be described, by way of example only, with reference to the accompanying drawings, wherein:

FIG. 1 is a partially transparent view of an animal herding device according to a preferred embodiment of the present invention, showing some of the internal features of the device, and showing optional padding thereon; and, FIG. 2 is similar to FIG. 1 but shows an alternate embodiment of the device with a rope defining an internal reinforcing means.

LIST OF REFERENCE NUMBERS IN DRAWINGS 10 stick
12 tube
14 rope in 12 (alternate embodiment)
15 handle
16 expanded portion of 15
18 wrist strap
20 shaker
22 inner cap
23 compartment
24 rattle members (BBs)
26 cap
28 padding (optional)

DESCRIPTION OF PREFERRED EMBODIMENTS

FIG. 1 shows a hand-held animal herding device or "stick" (generally designated by reference numeral 10), which will also be identified commercially by the trade-mark "Cattle Rattle". The stick has an elongate tubular body portion 12 made of a suitable material, namely one that is durable to resist most impacts by a herder on solid structures such as fences (for example, when the herder wishes to create noise to capture an animal's attention) and contact with the animals being herded (such as to nudge the animal to encourage movement in a particular direction), that can withstand extreme outdoor weather conditions (dry and wet) and temperature variations, and that is relatively lightweight for ease of handling by the herder and postpone hand fatigue. Good results have been achieved using a long 54 inch (137 cm) length of yellow polyethylene tubing having an outer diameter of about 1.10 inches (about 2.79 cm) and an internal diameter of about 0.84 inches (about 2.13 cm), and so a wall thickness of about 0.13 inches (about 0.33 cm). The yellow colour makes the stick bright and easy for the animals to see. However, one will appreciate that the size and colour of the tube and its material can vary depending on the stick's intended use (e.g. the type of animals to be herded) and the like. Nonetheless, at 54 inches the tube is longer than the prior art products to allow a herder to keep a more comfortable distance from the animals, to reduce the risk of accidental impact of the herder by the animal.

In an alternate embodiment of the stick shown in FIG. 2, a means of reinforcing the body portion has been provided in the form of a rope 14 located snuggly within the tube 12 along its length. Good results have been achieved with a common poly rope of 1 inch (2.5 cm) diameter, without making the stick unduly heavy. Other materials or objects (within the tube) and modes of fortifying the stick that were tried were not as effective and/or added too much weight to the stick and/or were not as cost effective. Although the internal reinforcing means of FIG. 2 may be used with the same body portion as in FIG. 1, it is particularly suitable for use with a "weaker" body portion, namely one with a thinner wall than that of the FIG. 1 embodiment. Repeated striking of such thinner unreinforced stick against various objects may result in unwanted kinks in the body portion, leading to premature failure and disposal of the stick. Hence, addition of the internal reinforcing means appears to avoid such kinking and extend the life-span of the stick.

Referring again to FIG. 1, a first, or near, end of the tube 12 is fitted with a gripping member for the user in the form of a handle 15. The handle is made of a cushioning material for a comfortable and easy grip, and is slip resistant. An expanded portion 16 of the handle provides a physical obstruction to resist slippage of the stick from the user's hand during use. A preferred handle is the "TOADSTOOL" or "LONGNECK" type from ODI. A closed loop member 18 defines a wrist strap located at the back end of the handle 15 to aid a user with carrying the stick, or for hanging the stick for storage when not in use.

It is noted that terms such as "rear", "back", "front", "near", "far" and the like are used for identifying certain features of the stick relative to the user when the stick is held by the handle. The use of these terms is not intended to limit the stick's use or orientation. Further, when describing the invention, all terms not defined herein have their common art-recognized meaning.

The opposed second, or far, end of the tube 12 has a noise making device in the form of a shaker 20 to catch the attention of the animal and urge it to move. The shaker is formed by locating an inner cap 22 within the tube at a distance from the tube's distal end to form a compartment 23 which is loosely filled with suitable rattle members 24 that create noise when the stick is shaken and the members impact the tube wall. Good results have been had with 8 or so BBs, but other hard items, such as small marbles or even pebbles, may be equally suitable for the task. The shaker 20 is plugged at the far end of the tube with a suitable cap 26 to retain the rattles 24 in the stick during use. In an alternate embodiment the inner cap 22 may be omitted, particularly if the rope 14 is present, but this is not preferred to avoid unwanted migration of the BBs up the shaft during use.

The stick may be fitted with optional padding 28 for certain uses, such as by pig farmers to avoid bruising of pigs if nudged or struck by the stick. The padding may be one or more pieces of foam or other suitable material, and fixed onto the tube's exterior, such as by glue. The padding should not be placed over the shaker 20 to avoid muffling the shaker's rattling noises.

The many advantages of the present invention may now be better understood. The stick 10 is an effective motivational tool to get animals moving. The easy grip handle 15 is slip resistant and comfortable to hold for extended periods. The polytube 12 is strong and is resistant to unwanted kinking or cracking, and may be further fortified with the rope reinforcement 14. The stick is long to keep the user comfortably away from the animals, and is lightweight along its length to avoid hand and arm fatigue over prolonged use. The rattling shaker 20 attacks animals' attention, and they seem to respond to it by moving in the user's direction, thus making it easier for the user to herd the animals as intended. The wrist strap makes it easier for a user to use his hands for different tasks (e.g. to push something) and yet keep the stick hanging on the user's arm close at hand. The stick may also be modified for use with certain animals that bruise more readily, such as pigs, by adding the foam padding 28.

The above description is intended in an illustrative rather than a restrictive sense, and variations to the specific configurations described may be apparent to skilled persons in adapting the present invention to other specific applications. Such variations are intended to form part of the present invention insofar as they are within the spirit and scope of the claims below.

I claim:

1. A device for herding livestock comprising a tubular body having a first end, an opposed second end and an elongate intermediate portion therebetween, said body including a hand gripping member at said first end, a noise making device to attract said livestock's attention, and a reinforcing means comprising rope engaging said intermediate portion thereaelong, wherein said noise making device is located in said body at said second end housing a plurality of rattle members confined from said intermediate portion to produce a desired noise.

2. The device of claim 1 wherein said body includes padding to avoid bruising said livestock upon contact, and is located adjacent said second end.

3. The device of claim 2 wherein said padding is located away from said noise making device to avoid muffling thereof.

4. A device for herding livestock comprising:
a hollow cylindrical body of generally uniform diameter having a first end with a hand gripping member connected thereto for manipulating said device when herding said livestock, a distal second end including a closed compartment, an elongate intermediate portion extending substantially between said first end and said closed compartment, said intermediate portion comprising kink-resistant tubing of a length which serves to comfortably distance a user from said livestock when herding, and a noise making device for attracting said livestock's attention located proximate to said distal second end and remote from a mid-point of said body, said noise making device comprising said closed compartment and a plurality of rattle members contained exclusively within said closed compartment for creating said noise when said body is shaken, wherein said intermediate portion and said first end lack said rattle members, and wherein said kink-resistant tubing further includes a reinforcing means extending along said intermediate portion.

5. The device of claim 4 wherein said reinforcing means comprises rope sized for a snug fit within said intermediate portion.

6. The device of claim 4 wherein said body includes padding to avoid bruising said livestock upon contact, and is located adjacent said second end.

7. A device for herding livestock comprising:
a hollow cylindrical body of generally uniform diameter having a first end with a hand gripping member connected thereto for manipulating said device when herding said livestock, a distal second end including a closed compartment, an elongate intermediate portion extending substantially between said first end and said closed compartment, said intermediate portion comprising kink-resistant tubing of a length which serves to comfortably distance a user from said livestock when herding, and a noise making device for attracting said livestock's attention located proximate to said distal second end and remote from a mid-point of said body, said noise making device comprising said closed compartment and a plurality of rattle members contained exclusively within said closed compartment for creating said noise when said body is shaken, wherein said intermediate portion and said first end lack said rattle members, and wherein said body includes padding to avoid bruising said livestock upon contact, and is located adjacent said second end.

8. The device of claim 7 wherein said padding is located away from said noise making device to avoid muffling thereof.

9. A device for herding livestock comprising:
a hollow cylindrical body of generally uniform diameter having a first end with a hand gripping member connected thereto for manipulating said device when herding said livestock, a distal second end including a closed compartment, an elongate intermediate portion extending substantially between said first end and said closed compartment, said intermediate portion comprising kink-resistant tubing of a length which serves to comfortably distance a user from said livestock when herding, and a noise making device for attracting said livestock's attention located proximate to said distal second end and remote from a mid-point of said body, said noise making device comprising said closed compartment and a plurality of rattle members contained exclusively within said closed compartment for creating said noise when said body is shaken, wherein said intermediate portion and said first end lack said rattle members, and wherein said body comprises polyethylene tubing and said length is approximately 54 inches.

10. A method of herding livestock comprising:
providing a herding device with a hollow cylindrical body of generally uniform diameter having a first end with a hand gripping member, a distal second end, an elongate intermediate portion between said first and second ends defined by flexible tubing, and a noise making compartment confining a plurality of rattle members adjacent said second end away from said intermediate portion;
approaching said livestock with said device in a herding location;
grasping said hand gripping member to manipulate said herding device during use;
creating noise from said noise making compartment to attract said livestock's attention; and,
urging said livestock to move in a particular direction.

11. The method of claim 10 wherein said urging includes contacting said livestock with said herding device.

12. The method of claim 11 wherein said contacting includes nudging said livestock with said body of said herding device.

13. The method of claim 10 wherein said creating noise includes shaking said herding device.

14. The method of claim 13 wherein said creating noise includes impacting said herding device against a solid structure.

15. The method of claim 10 further comprising providing said tubing with a length to comfortably distance a user from said livestock when herding.

16. A device for herding livestock comprising:
a hollow cylindrical body of generally uniform diameter having a first end with a hand gripping member connected thereto for manipulating said device when herding said livestock, a distal second end including a closed compartment, an elongate intermediate portion extending substantially between said first end and said closed compartment, said intermediate portion comprising kink-resistant tubing of a length which serves to comfortably distance a user from said livestock when herding, and a noise making device for attracting said livestock's attention located proximate to said distal second end and remote from a mid-point of said body, said noise making device comprising said closed compartment and a plurality of rattle members contained exclusively within said closed compartment for creating said noise when said body is shaken, wherein said intermediate portion and said first end lack said rattle members, and wherein said kink-resistant tubing comprises polyethylene tubing having a wall thickness of at least 0.13 inches and includes a reinforcing means extending along said intermediate portion.

17. The device of claim 16 wherein said reinforcing means comprises rope sized for a snug fit within said intermediate portion.

* * * * *